April 12, 1966     D. W. LAVIANA     3,245,157
AUDIO VISUAL TEACHING SYSTEM
Filed Oct. 4, 1963
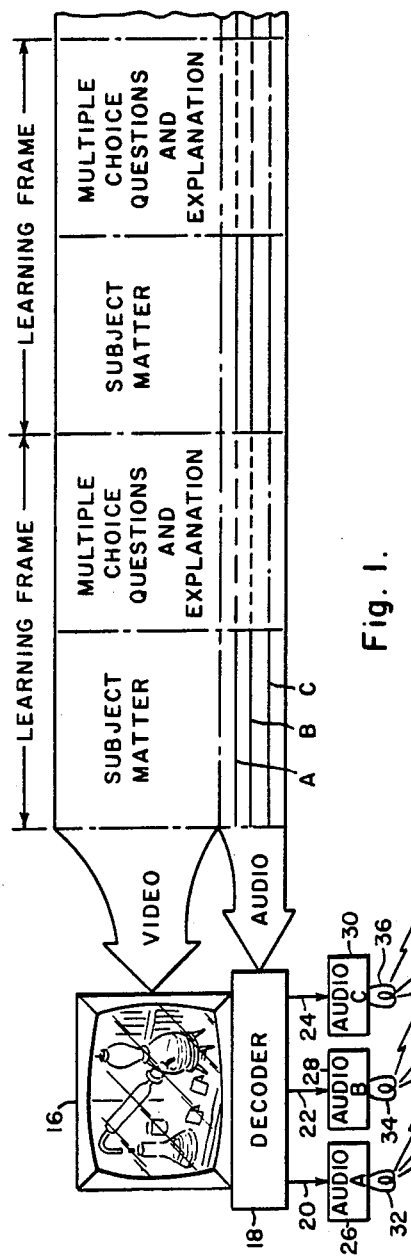
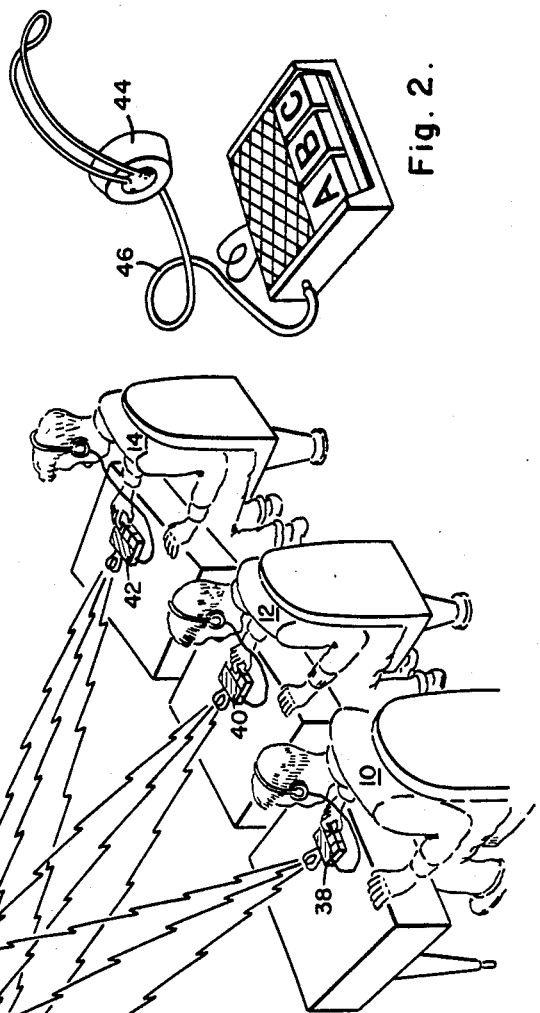
WITNESSES
INVENTOR
Donald W. Laviana.
BY
ATTORNEY United States Patent Office 3,245,157
Patented Apr. 12, 1966

3,245,157
AUDIO VISUAL TEACHING SYSTEM
Donald W. Laviana, Monroeville, Pa., assignor to Westinghouse Electric Corporation, East Pittsburgh, Pa., a corporation of Pennsylvania
Filed Oct. 4, 1963, Ser. No. 313,829
6 Claims. (Cl. 35—9)

The present invention relates to teaching machines, and more particularly to audio-visual teaching systems for aiding the learning processes of students.

Audio-visual teaching techniques, such as educational television, have been recognized to be highly beneficial in enhancing the learning process of students viewing and hearing the programmed material. For ideal effectiveness of learning, the educational material presented, it has been found, should be at a communicative level understood by the student, yet of a high enough level of sophistication not to bore the student. Communicative level as used herein encompasses those factors which are involved in the learning process of an individual. Among these factors are: vocabulary, sound and sight association, size, shape, form, color, intensity, and many others. The student's learning process may either be aided or hindered by communicative level selected to present educational material. This is especially true of the vocabulary chosen. A major shortcoming of presently used educational television facilities has been that it is an open-loop system, with the instructor presenting the educational material having no information fed back to him as to whether he is communicating with his students. Consequently, since there are no available or practical means for student feedback, the programmer must more or less guess at suitable or compromise communicative level to present the intended material. If the programmer selects a level or vocabulary of too high sophistication he will invariably lose a great number of students lacking a commensurate vocabulary. Alternately, if the programmer selects a communicative level of too low a level of intellligence many of the students, especially the more capable students, will lose interest in the material being presented.

Some investigators in the educational field maintain that educational material should be presented to the student in an untimed manner. That is, each student should be provided with the opportunity to learn in an unpaced manner according to the ability of the individual student. Such a teaching technique however requires that each student have separately programmed material aligned with the individual ability of that student. This is, of course, an expensive proposition. Moreover, the efficacy of such an unpaced technique may be questioned on the ground that even the most capable students may lose interest in proceeding at their own rate and thus not reach the same level of learning within the same time if the material were presented in some controlled or paced manner. Investigators advocating the latter method of paced learning maintain that this is an ideal system in that the student may be presented material at a rate comparable to his ability, while still being motivated due to the pace being set by the programmer. If, however, the material is to be programmed for the individual student, this teaching technique also becomes very expensive.

Additional motivation may be provided for the student by programming the educational material in a presentation-question-elaboration sequence. The usual and classical manner of presentation is the Socrates or lecture method, in which, a relatively long lecture is provided embodying the information intended to be taught to the students. After the lecture or a series of lectures the students are questioned or tested on the information contained in the lectures. Because of the communicative level of the material presented during the lecture or perhaps also because of the relatively distant testing period, the student may not give maximum attention to the lecture or may be lost because of the level of sophistication used in the lecture. A presentation-question-elaboration sequence of teaching would entail a relatively short time period for presentation of the information desired to be taught the students. Then a questioning period would be had on the material presented during the presentation period. Next an elaboration period would follow in which the answer to the questions would be discussed. It can be seen at this point that it would be highly advantageous to present educational material at different communicative levels to students of different capabilities so that the learning process of each student could be enhanced, rather than being bored or lost by an unjudicious selection of communicative levels.

It is therefore, an object of the present invention to provide new and improved audio-visual teaching apparatus.

It is a further object of the present invention to provide new and improved audio-visual teaching apparatus in which information may be received at a plurality of communicative levels.

It is a further object of the present invention to provide new and improved audio-visual teaching apparatus in which a paced teaching method is employed and wherein the learning process of the student is enhanced by presenting educational material at a plurality of communicative levels.

In general, the present invention accomplishes the above cited objects by providing audio-visual teaching apparatus in which both audio and visual information is presented to a student, with the audio information being provided at a plurality of communicative levels so that an individual student will select such a level to enhance the individual's learning process.

These and other objects and advantages of the present invention will become more apparent when considered in view of the following specification and drawings, in which:

FIGURE 1 is a diagrammatic representation of a classroom set up and a symbolic diagram showing the audio and video information as used in the present teaching apparatus; and FIG. 2 is a diagrammatic sketch showing the individual student receiving apparatus.

Referring now to FIG. 1, a symbolic representation of the audio and video information as utilized herein is shown having several learning frames. The audio and visual information may emanate from an educational TV station, video tape, closed circuit transmission, or other means, with the video portion of the signal being within the usual band in the very high frequency or ultra high frequency range. The audio portion of the information comprises a plurality of voice channels. As shown in FIG. 1, there are three voice channels A, B and C. The audio information is frequency modulated as in the typical television transmission system. However, in order to provide voice channels, the audio information transmitted may be multiplexed in order to provide three separate channels upon which different audio information may be impressed. It is, of course, not necessary that a multiplexing technique be used to provide the three voice channels. If it is desired, three separate non-interfering, voice channels using adjacent or separated band widths may be utilized. Also the audio information could be amplitude modulated. The important thing is to provide a plurality of voice channels upon which different information at different vocabulary levels may appear.

Each learning frame of the audio-video input information comprises two portions: a subject matter portion and a multiple choice question and explanation portion. The use of such a teaching sequence provides the method of presentation of material, questioning on the material presented and then an explanation of the material in lieu of the students response to the questions asked. Thus, the subject matter portion or presentation portion, as it will sometimes be called herein, presents the educational material to the student during the beginning portion of each learning frame. At this time the audio voice channels A, B and C carry audio information at one communicative level, which will be called herein the presentation level. As descriptively shown in FIG. 1, the same information is transmitted on each of the voice channels. However, if it is desired during the subject matter portion of the learning frame only one of the voice channels A, B or C need be utilized, since only the presentation level is being carried.

Immediately after the subject matter portion of the learning frame, the audio and visual information being transmitted contains either one or more multiple choice questions. For example, the student may choose one of three answers, each answer corresponding to one of the voice channels A, B or C. During the multiple choice questions and explanations portion of the learning frame, the video portion of the transmission is the same for all the students, however, different information is carried on each of the voice channels A, B and C of the audio portion of the transmission. This means according to the answer to the multple choice questions, different audio information will be supplied to the student selecting a given voice channel A, B or C. For instance, if the voice channel A is the correct answer for a question presented, the student will be informed of this and an elaboration of the subject matter will be carried over the voice channel A. If a student should select voice channel B or C, these being incorrect answers to the submitted question, then this will be related to the student and a clarification of the students mistake will be made at a lower, less sophisticated, communicative level. By doing this, the in error student may be brought up to the level of his capacity by alternate verbal communication more readily understood by him. This will be further explained subsequently.

In FIG. 1, a typical classroom arrangement is shown in which students 10, 12 and 14 view a class television receiver 16. The video portion of the television receiver 16 may be the same as any standard television receiver capable of receiving standard video telecasts. Thus, in response to the reception of the video information as described in FIG. 1, the subject matter in the multiple choice questions will be presented in pictorial manner on the screen of the set 16.

For proper reception of the audio information the television receiver 16 is slightly modified to have a decoder 18 incorporated therein. The function of the decoder is to receive the audio information in FM form on each of the three voice channels A, B and C and to separate the voice channels into their separate channels and also convert the FM signals into amplitude modulated (AM) signals. The decoder 18 would be tuned to receive the frequency upon which each of the voice channels A, B and C was transmitted. If the audio input were multiplexed, it would be necessary to separate the audio input from its various voice channels by demodulating means which are well known in the art. If the voice channels were transmitted over separate bands then the decoder 18 would separately be tuned to the respective frequencies of the voice channels.

The decoder 18, thus, receives the FM signals of the audio input and converts these into AM signals at its output terminals 20, 22 and 24. Audio transmitters 26, 28 and 30 are modulated by the signals on the outputs 20, 22 and 24 respectively. The audio transmitters are low power AM transmitters capable of transmitting AM signals short distances. The transmitters 26, 28 and 30 have loop antennas 32, 34 and 36 for radiating their respective outputs. The audio transmitter 26 transmits AM signals in response to the information appearing on channel A at a given frequency $f_a$. The audio transmitter 28 transmits AM signals at a frequency $f_b$ in response to information supplied by the voice channel B. The audio transmitter 30 transmits AM signals in response to audio information appearing on the voice channel C at a third frequency $f_c$.

Each of the audio transmitters, therefore, transmit AM signals in response to a separate one of the voice channels A, B or C. The decoder 18 serves to receive the audio information and separate the incoming audio information into its various voice channels and convert this information into AM signals which are used to modulate different carrier frequencies of the respective audio AM transmitters 26, 28 and 30. Alternately, the incoming FM information received by the decoder 18 may be kept in this form and retransmitted as such, or the students could receive the input signals directly.

The students 10, 12 and 14 are each supplied with student receivers 38, 40 and 42, respectively. The student receivers are identical and may, for example, be a small transistor AM radio receiver. The student receiver is better shown in FIG. 2. Each receiver has an earphone 44 connected to the audio output of the receiver through a jack input 46. Each of the student receivers has three pushbuttons corresponding to each of the voice channels A, B and C. By depressing a button, the student tunes his receiver to the particular carrier frequency, $f_a$, $f_b$ or $f_c$ associated with each of the voice channels being transmitted by the audio transmitters 26, 28 and 30. By depressing one of the buttons the student then receives the information appearing on the particular voice channel at the vocabulary level being transmitted on that voice channel.

To further explain the present teaching technique, an example may be helpful. Assume that a class in American History is being taught. Suppose that during the subject matter portion of the learning frame, the British surrender at Yorktown ending the Revolutionary War had been discussed. During this portion of the learning frame, video information would be transmitted to the class television receiver 16 concerning the British surrender. The audio portion would be at one communicative level and, for example, transmitted on all three voice channels A, B or C. The communicative level would be one of a rather high sophistication for the particular age group in that the level will later be correlated in response to questions asked the students at the end of the subject matter portion.

Assume, at the end of the subject matter portion of the learning frame, that the multiple choice question asked is: Who was the British general who surrendered to Washington at Yorktown?

Select one of the following answers:
(A) Cornwallis
(B) Braddock
(C) Burgoyne

The student, upon being requested to, selects one of the three names by depressing one of the buttons designated A, B or C on his student receiver. A student selecting the pushbutton A would receive the voice channel A would be informed that he had selected the correct answer, Lord Cornwallis. Then an elaboration would follow going into further details above those presented during the subject matter portion of the learning frame. This elaboration could be at a relatively sophisticated level, since the student selecting the correct answer has indicated his capacity of assimilating such information at the high level.

If however a student should select the answer B, for example, he would receive the information on the voice channel B having tuned his individual receiver to that voice channel. He would be told that he had selected an incorrect answer, that General Braddock was a general killed in the French and Indian Wars, and then in a remedial sequence the student would be instructed that the correct answer was A, Lord Cornwallis, who had surrendered to Washington at Yorktown. Then a further explanation would follow instructing the student at a lower communicative level including some of the former subject matter presented during the learning frame so that the student would be able to enhance his learning processes at the lower, more understandable to him, level.

If still another student would select the answer C, his individual receiver would be tuned to the voice channel C and he would be informed that the wrong answer had been selected. The student would be instructed that General Burgoyne was another British general of the Revolutionary War who had surrendered at the battle of Saratoga and that the correct answer was A, Lord Cornwallis. A discussion would then ensue explaining to the student at a lower communicative level than that on channel A of the subject matter as previously presented to aid the student's understanding of the material.

The lower communicative levels presented on the voice channels B and C, during the given learning frame, may be of the same level, however, need not be. If the multiple choice answers are so selected as to give a wide range if disparity, that is, if a certain answer even though wrong is closer to the right answer than the other, this would give a reasonable indication that the student selecting the closer answer should have his error explained at a higher level than one who selected a completely unconnected answer. As in the example given, the answer C, Burgoyne was closer to the correct answer than was the answer B, Braddock; thus, a student selecting the answer C could receive a higher level to aid his learning than perhaps could a student selecting the erroneous answer B. The level chosen for elaboration and explanation would have to be made carefully by the programmer.

After the explanation portion of the first learning frame, the next learning frame would begin again continuing the subject matter of the history lesson. The audio portion would again be transmitted at one communicative level with all the students receiving the same information on their respective student receivers. After the new subject matter had been completed another multiple choice question would be presented and the student being required to select an answer. The correct answer would allow the student to have the subject matter elaborated at a high level, while, on the other hand, an incorrect answer would reduce the communicative level to explain to the student at a lower level the material being presented so that the student could continue to the next learning frame with a basic understanding of the subject matter as presented.

It is not intended by the exemplary discussion to limit the present invention to educational television, either closed circuit or otherwise. The input information could be supplied through a motion picture providing the visual display with the sound track of the motion picture supplying the plurality of different voice channels. The sound track output then could be used to modulate the radio transmitters 26, 28 and 30, for example, at their respective carrier frequencies so that the individual student could receive the information with their student receivers and select the various channels as above. Moreover, slides could also be used for the visual presentation with the audio portion being recorded, for example, on a tape recorder having at least three channels. The channel outputs then could be used to modulate various local transmitters to provide the separate information on each of the voice channels.

Although the present invention has been described with the certain degree of particularity, it should be understood that the present disclosure has been made only by way of example, that numerous changes in the details of construction and the combination and arrangement of parts and elements may be resorted to without departing from the scope and the spirit of the present invention.

I claim as my invention:

1. In teaching apparatus utilizing audio and video information the combination of: class presentation means for receiving a predetermined frame of audio and video information, said audio information within said frame having a plurality of audio channels capable of carrying audio information at different communicative levels relative to common video information, said video information being the same for all audio channels, said class presentation means being operative to display said video information; and student receiving means for receiving each one of said audio channels in a given frame of information in a selective manner according to a student's learning process with the audio channel selected by the student being at a communicative level to enhance the learning process of the student.

2. In teaching apparatus utilizing audio and video information the combination of: class presentation means for receiving audio and video information, said information being presented in a plurality of learning frames, each of said frames including a presentation portion and a question and elaboration portion, said audio information within each frame having a plurality of audio channels capable of carrying audio information at different communicative levels relative to a common video information within said frame, said video information being the same for all audio channels, said audio information during a given frame being presented on at least one audio channel at one communicative level during the presentation portion and being presented on all of the audio channels at different vocabulary levels during the question and elaboration portion, said class presentation means being operative to display said video information, and student receiving means for receiving each of said audio channels in a selective manner, with a student selecting at the beginning of the question and elaboration portion one of the audio channels in response to the student's learning process during the presentation portion of a learning frame with said one audio channel selected by the student being at a communicative level to enhance the learning process of the student.

3. In teaching apparatus utilizing audio and video information the combination of: class presentation means for receiving audio and video information, said information being presented in a plurality of learning frames, said audio information having a plurality of audio channels during each learning frame capable of carrying audio information at different communicative levels relative to the video information during each frame, said video information being the same for all audio channels, said class presentation means including video means for displaying said video information and class transmitting means for separately transmitting each of the audio channels, and student receiving means for receiving each of said audio channels during each learning frame, said student receiving means including selector means for permitting a student to select one of said audio channels in response to the student's learning process with the audio channel selected by the student during each learning frame being at a communicative level to enhance the learning process of the student.

4. In teaching apparatus utilizing audio and video information the combination of: class presentation means for receiving audio and video information in discrete learning frames, said audio information during each frame having a plurality of audio channels capable of carrying audio information at different communicative levels relative to the video information of that frame, said video information being the same for all audio channels, said class presentation means including video means for displaying said video information, demodulating means for converting said audio information into its respective audio channels and class transmitting means for separately transmitting each of the audio channels and student receiving means for receiving the audio channels, said student receiving means including selector means for permitting a student to select one of said audio channels during each learning frame in response to the student's learning process and transducer means to convert the audio channel received into sound audible to the student, with the audio channel selected by the student being at a communicative level to enhance the learning process of the student.

5. In teaching apparatus utilizing audio and video information the combination of: class presentation means for receiving audio and video information, said information being presented in a plurality of learning frames, each of said frames including a presentation portion and a question and elaboration portion, said audio information during each frame having a plurality of voice channels capable of carrying audio information at different communicative levels relative to the video information during said frame, said video information being the same for all audio channels, said audio information being presented on at least one voice channel at one communicative level during the presentation portion and being presented on all of the voice channels at different communicative levels during the question and elaboration, said class presentation means including video means for displaying said video information, demodulating means for converting said audio information into its respective voice channels and class transmitting means for separately transmitting each of the voice channels and student receiving means for receiving the voice channels, said student receiving means including selector means for permitting a student to select at the beginning of the question and elaboration portion one of the voice channels in response to the student's learning process during the presentation portion of a learning frame and transducer means to convert the voice channel received into sound audible to the student, with the voice channel selected by the student being at a communicative level to enhance the learning process of the student.

6. In teaching apparatus utilizing audio and video information the combination of: information transmitting means for transmitting audio and video information, said information being presented in a plurality of learning frames, each of said frames including a presentation portion and a question and elaboration portion, said audio information during each learning frame having a plurality of voice channels capable of carrying audio information at different comunicative levels relative to common video information during the same learning frame, said video information being the same for all audio channels, said audio information being presented on at least one voice channel at one communicative level during the presentation portion and being presented on all of the voice channels at different communicative levels during the question and elaboration portion, class receiving means for receiving said audio and video information, said class receiving means including video means for displaying said video information, demodulating means for converting said audio information into its respective voice channels and class transmitting means for separately transmitting each of the voice channels, and student receiving means for receiving the voice channels, said student receiving means including selector means for permitting a student to select at the beginning of the question and elaboration portion one of the voice channels in response to the student's learning process during the presentation portion of a learning frame and transducer means to convert the voice channel received into sound audible to the student, with the voice channel selected by the student being at a communicative level to enhance the learning process of the student.

References Cited by the Examiner

UNITED STATES PATENTS 3,008,000 11/1961 Morchand _____ 35—8
3,122,847 3/1964 Redfield et al. _____ 35—35.3

EUGENE R. CAPOZIO, *Primary Examiner.*

LAWRENCE CHARLES, *Examiner.*

W. GRIEB, *Assistant Examiner.*